(12) United States Patent
Motosugi et al.

(10) Patent No.: US 12,424,003 B2
(45) Date of Patent: Sep. 23, 2025

(54) COLLATION DEVICE, NON-TRANSITORY COMPUTER READABLE MEDIUM STORING PROGRAM, AND COLLATION METHOD

(71) Applicant: FUJIFILM Business Innovation Corp., Tokyo (JP)

(72) Inventors: Yukari Motosugi, Kanagawa (JP); Ken Sato, Kanagawa (JP); Minoru Oshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 397 days.

(21) Appl. No.: 17/586,787

(22) Filed: Jan. 28, 2022

(65) Prior Publication Data

US 2023/0113156 A1 Apr. 13, 2023

(30) Foreign Application Priority Data

Sep. 24, 2021 (JP) ................................ 2021-155852

(51) Int. Cl.
*G06V 20/80* (2022.01)
*G06V 10/20* (2022.01)
*G06V 10/56* (2022.01)
*G06V 20/00* (2022.01)

(52) U.S. Cl.
CPC ............ *G06V 20/80* (2022.01); *G06V 10/255* (2022.01); *G06V 10/56* (2022.01); *G06V 20/95* (2022.01)

(58) Field of Classification Search
CPC ...... G06V 10/56; G06V 10/255; G06V 20/80; G06V 20/95
See application file for complete search history.

(56) References Cited

U.S. PATENT DOCUMENTS

| 5,521,984 A | * | 5/1996 | Denenberg | ............... G07C 9/37 |
| | | | | 382/209 |
| 11,501,517 B2 | * | 11/2022 | Takahashi | ............ G06V 10/758 |
| 2003/0123715 A1 | * | 7/2003 | Uchida | ............... G06V 40/1335 |
| | | | | 382/284 |

(Continued)

FOREIGN PATENT DOCUMENTS

| EP | 2682912 | 1/2014 |
| EP | 3252720 | 12/2017 |

(Continued)

OTHER PUBLICATIONS

"Search Report of Europe Counterpart Application", issued on Aug. 19, 2022, pp. 1-8.

(Continued)

*Primary Examiner* — Daniel I Walsh
(74) *Attorney, Agent, or Firm* — JCIPRNET

(57) ABSTRACT

A collation device includes a processor configured to, by executing a program: (a) acquire a photographed image including a collation area provided on an object and a reference position area that serves as a reference for a position of the collation area; (b) detect the reference position area from the photographed image; (c) set a peripheral image area in the photographed image based on the reference position area and predetermined relative coordinates; and (d) detect the collation area in the peripheral image area.

16 Claims, 10 Drawing Sheets

(56) References Cited

U.S. PATENT DOCUMENTS

| | | | | |
|---|---|---|---|---|
| 2004/0234122 | A1* | 11/2004 | Kochi | G01B 11/24 348/E13.016 |
| 2007/0242882 | A1 | 10/2007 | Chiba et al. | |
| 2010/0283883 | A1* | 11/2010 | Sato | H04N 23/80 348/E5.025 |
| 2011/0026810 | A1* | 2/2011 | Hu | G06F 18/2148 382/190 |
| 2011/0194776 | A1* | 8/2011 | Nakamura | G06T 7/60 382/195 |
| 2012/0206581 | A1* | 8/2012 | Kanamori | G02B 27/286 348/370 |
| 2016/0300107 | A1* | 10/2016 | Callegari | G06V 20/80 |
| 2017/0287147 | A1* | 10/2017 | Takahashi | G06T 7/35 |
| 2017/0323507 | A1* | 11/2017 | Masuda | G07D 7/003 |
| 2018/0089483 | A1* | 3/2018 | Norimatsu | G06V 40/1376 |
| 2018/0349695 | A1* | 12/2018 | Le Henaff | G06F 18/22 |
| 2019/0012868 | A1* | 1/2019 | Okada | G07D 7/1205 |
| 2019/0028659 | A1* | 1/2019 | Kawata | H04N 23/611 |
| 2019/0279377 | A1* | 9/2019 | Takahashi | G07G 1/009 |
| 2019/0347827 | A1* | 11/2019 | Omori | G01C 11/06 |
| 2020/0019810 | A1* | 1/2020 | Takahashi | G06T 7/00 |
| 2020/0057888 | A1* | 2/2020 | Angelakos | G06F 21/30 |
| 2020/0311365 | A1* | 10/2020 | Cottrill | G06K 19/06084 |
| 2020/0316979 | A1* | 10/2020 | Bud | G07D 7/17 |
| 2020/0349379 | A1 | 11/2020 | Ross | |
| 2020/0380753 | A1* | 12/2020 | Adachi | G06T 15/20 |
| 2022/0349827 | A1* | 11/2022 | Kondo | H04N 23/69 |
| 2023/0071341 | A1* | 3/2023 | Sugiyama | G06T 7/0004 |
| 2023/0098952 | A1* | 3/2023 | Motosugi | G07D 7/003 348/380 |
| 2023/0099580 | A1* | 3/2023 | Sato | G06T 5/94 382/177 |
| 2023/0113156 | A1* | 4/2023 | Motosugi | G06V 10/245 235/375 |
| 2023/0118236 | A1* | 4/2023 | Motosugi | H04N 23/56 348/124 |
| 2023/0377310 | A1* | 11/2023 | Tanaka | G06T 7/70 |
| 2024/0257544 | A1* | 8/2024 | Takano | G06V 10/987 |
| 2024/0257547 | A1* | 8/2024 | Hattori | G06V 30/162 |
| 2024/0371209 | A1* | 11/2024 | Hayashi | G06V 20/59 |

FOREIGN PATENT DOCUMENTS

| | | |
|---|---|---|
| EP | 3734506 | 11/2020 |
| JP | 4865204 | 2/2012 |
| JP | 2014029678 | 2/2014 |
| JP | 6751521 | 9/2020 |
| JP | 6813807 | 1/2021 |
| WO | 2006070476 | 7/2006 |
| WO | 2016035774 | 3/2016 |
| WO | 2017010460 | 1/2017 |

OTHER PUBLICATIONS

"Office Action of Europe Counterpart Application", issued on Apr. 21, 2023, p. 1-p. 4.

"Search Report of Europe Counterpart Application", issued on Sep. 27, 2023, pp. 1-10.

"Notice of Reasons for Refusal of Japan Counterpart Application", issued on May 27, 2025, with English translation thereof, p. 1-p. 8.

* cited by examiner

COLLATION DEVICE, NON-TRANSITORY COMPUTER READABLE MEDIUM STORING PROGRAM, AND COLLATION METHOD

CROSS-REFERENCE TO RELATED APPLICATIONS

This application is based on and claims priority under 35 USC 119 from Japanese Patent Application No. 2021-155852 filed Sep. 24, 2021.

BACKGROUND

(i) Technical Field

The present invention relates to a collation device, a non-transitory computer readable medium storing a program, and a collation method.

(ii) Related Art

JP2014-029678A discloses system that has few restrictions on image acquisition in authenticity determination of a product using a photographed image of a random pattern. Specifically, a system is disclosed that performs authenticity determination of a product by collating a random pattern in a specific area of a product and includes a memory that stores a feature amount of a mark of an area of a genuine product in a reference state at a specific position with respect to an area, image acquisition means for photographing a target product including the mark and the area, image processing means for acquiring a conversion parameter that makes the mark in the image the same as the mark in the reference state, and correcting the area in the image to an image indicating the area in a case where the mark is in the reference state by the parameter, extraction means for extracting a feature amount from the image of the area portion, comparison processing means for calculating a degree of similarity by comparing the feature amount obtained by the extraction means with the feature amount stored in the memory, and determination means for determining whether or not the degree of similarity exceeds a predetermined threshold.

JP6751521B discloses a data acquisition device that includes acquisition means for acquiring feature data representing features distributed in an area of a predetermined size determined based on both an outer shape of an object and a position defined by a position of print information printed on the object from an image including the object to be registered as registration data, and storage means for storing the registration data acquired by the acquisition means as data for determining an identity of the object, in which, in a case where a position of print information of a certain object is deviated from a preset printing position by determining the position of the area of a predetermined size based on both the outer shape of the object and the position defined by the position of the print information printed on the object and acquiring the feature data, the acquisition means determines the position of the area of the predetermined size with a positional relationship different from a positional relationship between the position of the print information and the area of the predetermined size in another object of which the position of the print information does not deviate from the preset printing position, and acquires the feature data.

JP4865204B discloses an image processing method including registering an same image pattern as a search target as a template image in advance in order to detect an image pattern to be searched from a photographed image of an inspection target product including random noise, acquiring a plurality of the photographed images of the inspection target product by performing photographing a plurality of times at the same position, creating a searched image by performing weighted average processing on the plurality of photographed images, executing pattern matching using the template image for the searched image, photographing in advance, as an image to assist the weighted average processing, a subject that serves as an inspection reference having the same size, shape, and pattern as the inspection target product, extracting and registering a weighted average assisting image having the same size and image pattern as the template image from the photographed image of the reference subject, the weighted average processing being performed by selecting an image area in which the photographed images have the same coordinates and that has the same size as the template image from the plurality of photographed images while shifting the image area from a start point to an end point in pixel units and adding the weighted average assisting image as well to the selected image area, and pattern matching between the weighted average processed image and the template image.

JP6813807B discloses an individual identification device that includes a generation unit that generates a pattern on an object, an imaging unit that detects the generation of the pattern and images the generated pattern, and a housing that houses the generation unit and the imaging unit and has an opening on a lower surface, in which the generation unit is configured to freely move forward and backward between a standby position and a generation position, and generate the pattern on the object through the opening in a case where the generation unit moves from the standby position to the generation position in a state where the lower surface of the housing is placed on the object so as to be in contact with the object, the housing includes first detection means for detecting that the generation unit is located at the generation position, the imaging unit detects the generation of the pattern based on the detection result of the first detection means, and images the pattern on the object through the opening, the housing includes second detection means for detecting that the generation unit is located in the standby position, and the imaging unit detects the generation of the pattern based on the detection result of the first detection means, and then images at the timing when the generation unit moves from the generation position to the standby position based on the detection result of the second detection means.

SUMMARY OF THE INVENTION

In a case where a user photographs a collation area by using a mobile terminal and collates with a registered image, it is necessary to reliably acquire the collation area, but in a case where the user holds the mobile terminal and photographs, a position of the collation area may be unstable due to camera shake or the like. Although it is conceivable to prepare a reference mark separately from the collation area and specify the collation area with relative coordinates predetermined from a reference mark, since a relative positional relationship between the reference mark and the collation area fluctuates due to the camera shake or the like during photographing, it is difficult to reliably acquire the collation area with the reference mark alone.

Aspects of non-limiting embodiments of the present disclosure relate to a collation device, a non-transitory computer readable medium storing a program, and a collation method that provide a technology capable of acquiring a collation area more reliably than a case where a collation area is simply acquired by relative coordinates from a reference mark.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a collation device including a processor configured to, by executing a program:
(a) acquire a photographed image including a collation area provided on an object and a reference position area that serves as a reference for a position of the collation area;
(b) detect the reference position area from the photographed image;
(c) set a peripheral image area in the photographed image based on the reference position area and predetermined relative coordinates; and
(d) detect the collation area in the peripheral image area.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the drawings.

An individual identification system that uniquely identifies an object by photographing a surface image of the object and performing image collation between a registered image and a collation image will be described as an example.

The individual identification system is a technology that registers an image of a part of a surface of an object, specifically about 0.1 to several mm in advance information unique to the object and uniquely identifies that the object to be collated is the same as the registered object, that is, the object is genuine, and the information unique to the object is, for example, a random pattern by a fine pattern. A satin pattern is a specific example of the random pattern by the fine pattern. The satin pattern is not limited to one obtained by surface treatment such as frosted glass, and has a concept that includes not only the satin pattern applied by treatment processing to metal, synthetic resin (plastic or the like), or the like, but also a wrinkle pattern obtained by embossing treatment and randomly woven fiber pattern, a random fine dot pattern by printing, a random particle distribution by printing with ink containing glitter particles, and unevenness formed on sandblasted glass surface or the like. Further, the satin pattern includes not only an unintentionally formed satin pattern but also an intentionally formed satin pattern for identification or collation. In short, the satin pattern is a random pattern that is difficult to control and form. It may be said to be a kind of "artifact metrics" that optically reads such a random pattern and uses the random pattern as information.

Here, a case is assumed in which a printing substrate having unevenness such as a hologram and paper is used as the printing substrate, and an ink portion in which metal particles are dispersed is printed on the printing substrate having such unevenness to form a random pattern.

Figure 1:
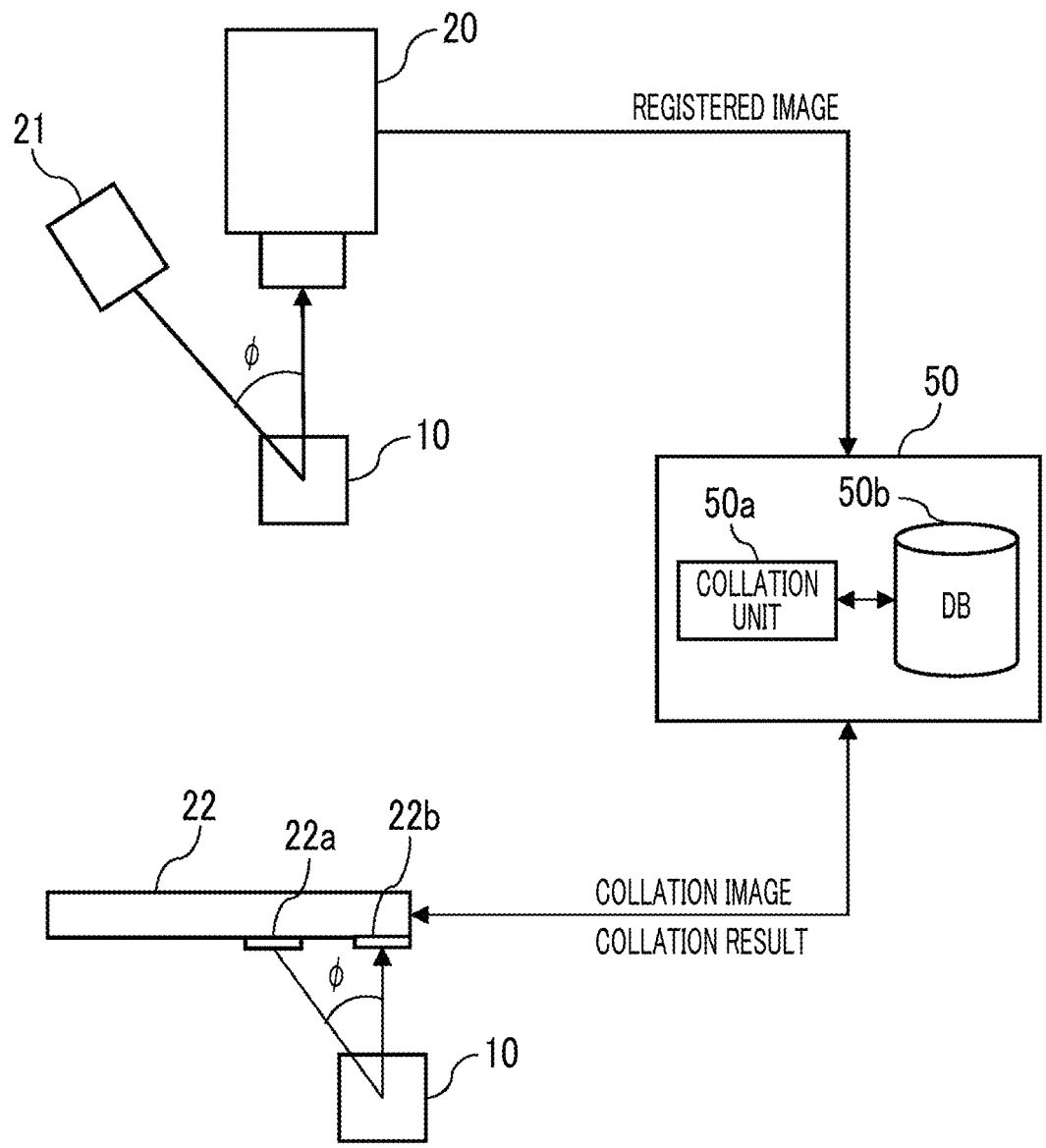
FIG. 1 is a system configuration diagram of an exemplary embodiment.

FIG. 1 shows a system configuration of the present exemplary embodiment. The collation system includes a registered image photographing machine 20, a collation image photographing machine 22, and a server computer 50. The registered image photographing machine 20 and the server computer 50, and the collation image photographing machine 22 and the server computer 50 are connected to each other by a communication network.

An object 10 is irradiated with a light source unit 21 such as an LED, and light reflected from the object 10 is photographed by the registered image photographing machine 20 to acquire a registered image. The registered image photographing machine 20 and the light source unit 21 can be composed of dedicated equipment for registration.

An irradiation angle φ of the irradiation light from the light source unit 21 is set to a certain fixed angle. The acquired registered image is transmitted to the server computer 50 and stored in a registered image DB 50b in the server computer 50.

On the other hand, the object 10 is photographed by using a mobile terminal such as a smartphone held by the user of the collation system as the collation image photographing machine 22. The object 10 is irradiated with a light source unit 22a such as an LED mounted on a smartphone or the like, and light reflected from the object 10 is photographed by the camera unit 22b mounted on the smartphone or the like. An irradiation angle φ of the irradiation light from the light source unit 22a is set to be substantially the same as an angle φ which is the condition in a case where the registered image is acquired. The reason is that, as described above, the random pattern of the ink portion changes depending on an irradiation direction of light, so that it is necessary to set a positional relationship between the light source unit 22a, the camera unit 22b, and the object 10 to be substantially the same as a positional relationship at the time of photographing the registered image 16.

A processor of the collation image photographing machine 22 performs a series of processing on the photographed image to extract the ink portion from the photographed image, further cuts out the collation image as a collation area from the area of the ink portion, and transmits the collation image to the server computer 50 via the communication network. The processing of the processor of the collation image photographing machine 22 will be further described later.

The server computer 50 includes a collation unit 50a and the registered image DB 50b.

The registered image DB 50b is composed of a storage device such as a hard disk or a solid state drive (SSD), and stores an identifier ID for uniquely specifying the object 10 and the registered image in association with each other.

The collation unit 50a is composed of a processor, and stores the registered image received from the registered image photographing machine 20 in the registered image DB 50b in association with the ID of the object 10. Further, the collation unit 50a performs image collation between the collation image received from the collation image photographing machine 22 and the registered image stored in the registered image DB 50b, and outputs the collation result to the collation image photographing machine 22. Specifically, the collation unit 50a reads the registered image from the registered image DB 50b, performs collation calculation with the collation image, and calculates the degree of similarity between the two images. For the calculation of the degree of similarity, a known algorithm such as feature amount matching by feature amount detection, template matching using image shading comparison, and the like can be used. The calculated degree of similarity is compared with a threshold, and in a case where the degree of similarity exceeds the threshold, it is determined that the images match, and in a case where the degree of similarity does not exceed the threshold, it is determined that the images do not match. The collation unit 50a transmits the collation result to the collation image photographing machine 22 via the communication network.

In the image collation, there is an error rate due to fluctuations in the input of the registered image photographing machine 20 or the collation image photographing machine 22 to an image sensor, quantization error, and the like. The error rate consists of two, a false rejection rate, which is the probability of determining false even though it is true, and a false acceptance rate, which is the probability of determining true even though it is false. The two are in a trade-off relationship, and in a case where one decreases, the other increases. Therefore, a threshold is set so that the loss in the application target of the collation determination is the smallest.

Note that a plurality of the registered images may be acquired by changing the irradiation direction of light and registered in the registered image DB 50b of the server computer 50, and the image collation between the plurality of registered images and the collation image may be performed.

Figure 2:
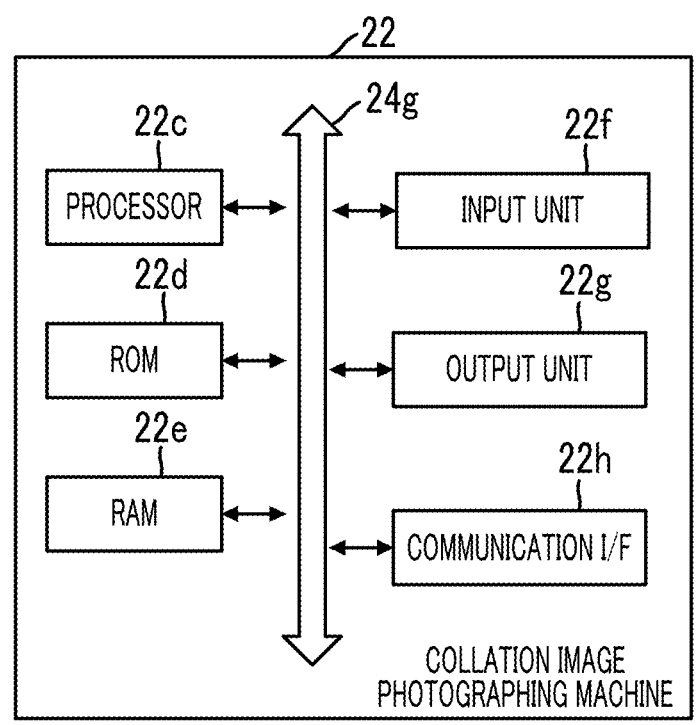
FIG. 2 is a block diagram of a configuration of a collation image photographing machine of an exemplary embodiment.

FIG. 2 shows a block diagram of a main configuration of a collation image photographing machine 22 such as a smartphone. The collation image photographing machine 22 includes a processor 22c, a ROM 22d, a RAM 22e, an input unit 22f, an output unit 22g, and a communication I/F 22h in addition to the light source unit 22a and the camera unit 22b described above.

The processor 22c reads out an application program stored in the ROM 22d, executes a series of processing using the RAM 22e as a working memory, extracts the ink portion from the photographed image photographed by the camera unit 22b, and further cuts out the collation image. The processor 22c transmits the cut-out collation image to the server computer 50 via the communication I/F 22h. Further, the processor 22c receives the collation result from the server computer 50 via the communication I/F 22h.

The input unit 22f is composed of a keyboard, a touch switch, or the like, and the user operates the input unit 22f to start the application program.

The output unit 22g is composed of a liquid crystal display, an organic EL display, or the like and functions as a display unit, and displays a preview image in a case where the object 10 is photographed. Further, the output unit 22g may display a guide in a case where photographing the object 10 by the control command from the processor 22c. The guide will be further described later. Further, the output unit 22g displays the collation result received from the server computer 50 by the control command from the processor 22c. The collation result is either "match" or "mismatch", but other messages related to the collation may be displayed.

Figure 3A:
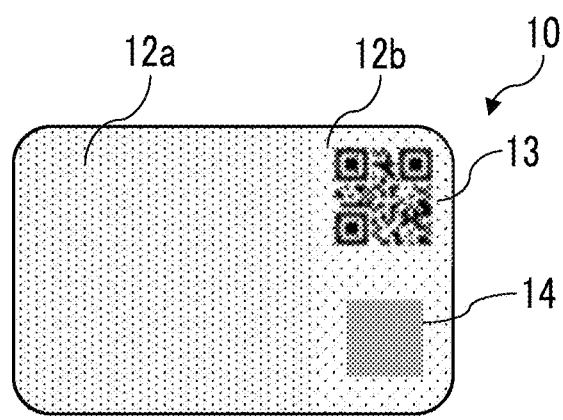
FIGS. 3A and 3B are plan diagrams of an object including a hologram portion and an object of paper of an exemplary embodiment.
Figure 3B:
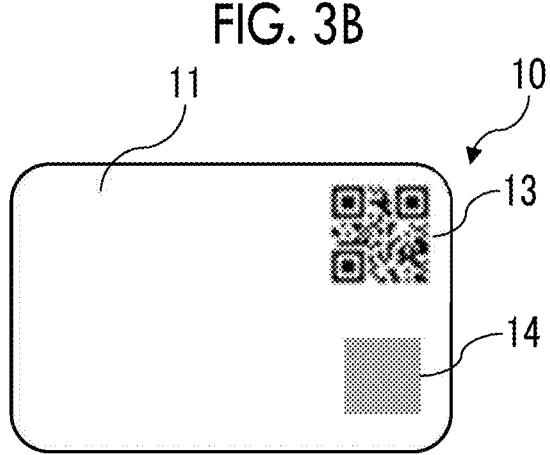

FIGS. 3A and 3B show plan diagrams of the object 10 in the present exemplary embodiment.

FIG. 3A shows a case where a hologram label seal is used as the object 10. The hologram label seal includes hologram portions 12a and 12b, a QR code 13, and an ink portion 14.

The hologram portion 12a is formed substantially on a left half of the label seal and forms a hologram pattern.

The hologram portion 12b is formed substantially on a right half of the label seal and is subjected to satin treatment, so that color development of rainbow color is changed depending on an elevation angle. Here, the "elevation angle" means an angle formed by an LED light source 22a, the object 10, and the camera unit 22b in FIG. 1. For example, it is desirable that the elevation angle matches an angle φ in FIG. 1.

The QR code 13 is formed on the satin-treated hologram portion 12b. For the QR code 13, various information about the label seal is printed as a QR code. Further, in the present exemplary embodiment, the QR code 13 is printed at a fixed position with respect to an alignment mark for print (not shown). The ink portion 14 is printed at the fixed position with respect to the print alignment mark in another process. Therefore, the QR code 13 and the ink portion 14 are printed with a substantially fixed relative positional relationship, and the QR code 13 can also function as a positioning mark and a reference position area for extracting the ink portion 14.

The ink portion 14 is gravure-printed with gravure ink containing silver particles on the satin-treated hologram portion 12b to form a polygonal shape. In the figure, the ink portion 14 is printed in a square shape at a lower part of the QR code 13 at a fixed interval. The ink portion 14 is a random pattern area, which is a collation area to be photographed and extracted by the collation image photographing machine 22. The shape of the ink portion 14 may be an ellipse (including a circle) as well as a polygon.

FIG. 3B shows a case where a paper label seal is used as another object 10. The paper label seal includes a paper portion 11, the QR code 13, and the ink portion 14.

The QR code 13 is formed on the paper portion 11. For the QR code 13, various information about the label seal is printed as a QR code. The QR code 13 is printed with the relative positional relationship with respect to the ink portion 14 fixed in advance. Therefore, the QR code 13 can also function as a positioning mark for extracting the ink portion 14.

The ink portion 14 is toner-printed on the paper portion 11 with toner ink containing silver particles to form a polygonal shape. In the figure, the ink portion 14 is printed in a square shape at a lower part of the QR code 13 at a fixed interval. The ink portion 14 is a random pattern area, which is a collation area to be photographed and extracted by the collation image photographing machine 22.

Figure 4A:
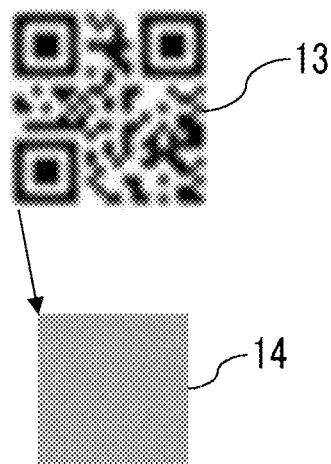
FIGS. 4A and 4B are diagrams showing peripheral area setting of an exemplary embodiment.
Figure 4B:
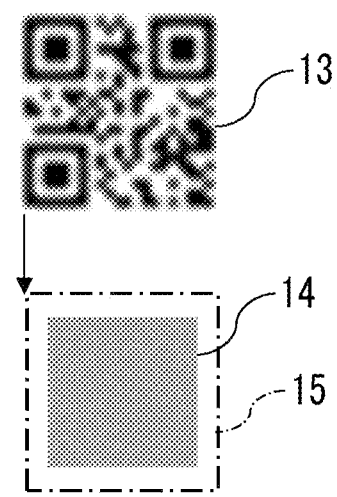

FIGS. 4A and 4B schematically show positional relationships between the QR code 13 and the ink portion 14. In a case where a mobile terminal such as a smartphone is used as the collation image photographing machine 22, the position of the ink portion 14 in the photographed image is unstable because the user manually photographs the image. Since it is necessary to acquire an image at an accurate position as a collation image to be transmitted to the server computer 50, the QR code 13 formed in the vicinity of the ink portion 14 in a preset relative positional relationship is used as the positioning mark.

FIG. 4A schematically shows position specifying processing of the ink portion 14 using the relative positional relationship between the QR code 13 and the ink portion 14. In order to extract the ink portion 14, the QR code 13 is first detected. In a case where the QR code 13 is detected, the position of the ink portion 14 is specified by using a known relative positional relationship between the QR code 13 and the ink portion 14 (the relative positional relationship is indicated by a vector in the figure). Then, the square ink portion 14 is extracted from the photographed image at the specified position.

However, there may be variations in the relative positional relationship between the QR code 13 and the ink portion 14 due to variations in the printing position. Further, the relative positional relationship between the QR code 13 and the ink portion 14 may fluctuate due to camera shake or the like during photographing. Therefore, it is difficult to reliably and stably acquire the ink portion 14 as the collation area only with the QR code 13 as the positioning mark and information on the known relative positional relationship.

Therefore, as shown in FIG. 4B, in a case where the QR code 13 is detected, the peripheral image area 15 is set so as to enclose the ink portion 14 larger than the known size of the ink portion 14, from a second relative positional relationship set in advance. The shape of the peripheral image area 15 is optional, but as shown by the alternate long and short dash line in FIG. 4B, the shape of the peripheral image area 15 may be a square that is similar to the shape of the ink portion 14, for example. The peripheral image area 15 is set to have a shape and size that can reliably enclose the ink portion 14 even in a case where the relative positional relationship between the QR code 13 and the ink portion 14 varies. As an example, the shape of the peripheral image area 15 is similar to the shape of the ink portion 14, and the size of the peripheral image area 15 is 50% larger than the size of the ink portion 14, but the shape and size are not limited thereto.

In a case where the peripheral image area 15 is set from the positional relationship with the QR code 13 as the positioning mark, the processor 22c of the collation image photographing machine 22 extracts the ink portion 14 having a known shape (in this case, a square) in the peripheral image area 15.

The peripheral image area 15 is set as internal processing by the processor 22c of the collation image photographing machine 22, but the processor 22c may display the set peripheral image area 15 on the output unit 22g so that the user can visually recognize the peripheral image area 15. The peripheral image area 15 displayed on the output unit 22g functions as a guide for the ink portion 14 to the user.

Figure 5A:
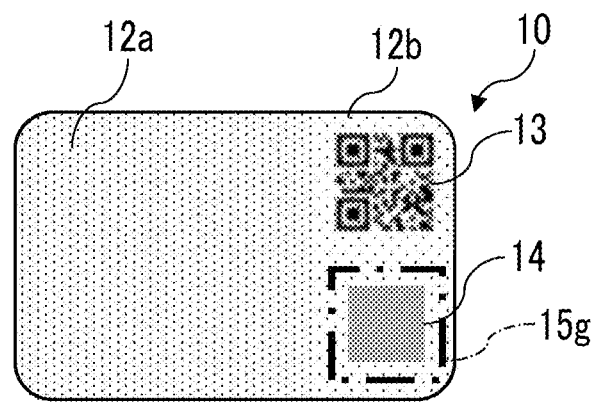
FIGS. 5A and 5B are explanatory diagrams (No. 1) of a guide displayed on an output unit (display unit) of a collation image photographing machine of an exemplary embodiment.
Figure 5B:
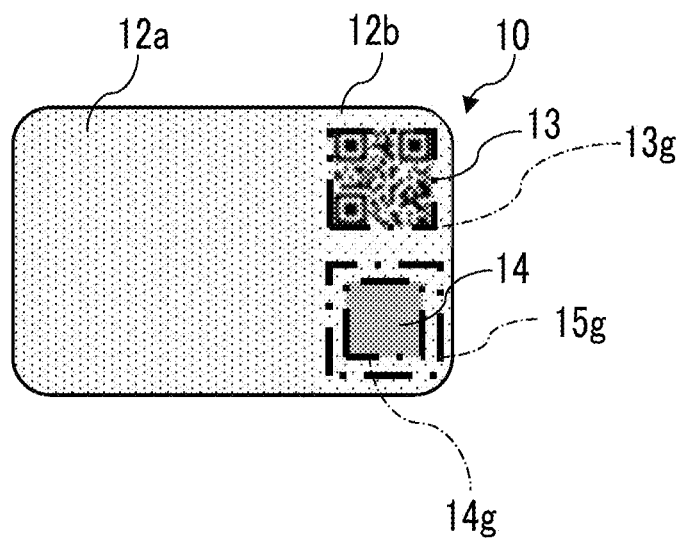

FIGS. 5A and 5B show examples of a guide displayed on the output unit 22g of the collation image photographing machine 22. FIG. 5A is an example of a guide frame 15g indicating the peripheral image area 15 set by the processor 22c. The peripheral image area 15 uses the QR code 13 detected earlier as a positioning mark, and is set as an area having a preset shape and size having a second relative positional relationship preset from the QR code 13. The guide frame 15g is superimposed and displayed on a preview display of the output unit 22g in accordance with the peripheral image area 15 thus set.

That is, the photographed image of the object 10 is preview-displayed on the output unit 22g, and the guide frame 15g is displayed with reference to the QR code 13 detected in the preview display. The user appropriately adjusts a distance between the collation image photographing machine 22 and the object 10 by using the guide frame 15g as a guide, and adjusts so that the ink portion 14 is located in the guide frame 15.

Note that since, for example, it is desirable that the distance between the collation image photographing machine 22 and the object 10, more specifically, the distance (photographing distance) between the camera unit 22b of the collation image photographing machine 22 and the object 10 is close to the distance (photographing distance) at the time of acquiring the registered image, the processor 22c may measure the photographing distance between the camera unit 22b and the object 10, and display the guide frame 15g on the output unit 22g at the time point when the photographing distance is close to a desired photographing distance. As a result, the user gradually approaches the object 10 with the camera unit 22b facing the object 10 while grasping the collation image photographing machine 22 such as a smartphone, and the guide frame 15g is preview-displayed, thereby adjusting the position of the collation image photographing machine 22 so that the ink portion 14 is located within the guide frame 15g. Since the size of the ink portion 14 is known and the size of the peripheral image area 15 is also set according to the size of the ink portion 14, the size of the guide frame 15g preview-displayed at the time point when the photographing distance is close to the desired photographing distance is also calculated by the processor 22c.

FIG. 5B shows another example of the guide displayed on the output unit 22g of the collation image photographing machine 22. In addition to the guide frame 15g indicating the peripheral image area 15, a guide frame 13g indicating the QR code 13 is displayed on the output unit 22g, and a guide frame 14g indicating the ink portion 14 is further displayed on the output unit 22g. The guide frame 13g is displayed along a contour of the QR code 13 in a case where the QR code 13 is detected. Further, the guide frame 14g is displayed as a candidate area in which the ink portion 14 exists inside the guide frame 15g after the guide frame 15g is displayed or together with the display of the guide frame 15g. Since the guide frames 13g, 14g, and 15g have different guide targets, the guide frames 13g, 14g, and 15g can be displayed so as to be identifiable by different colors, different patterns, or the like.

As described above, the peripheral image area 15 is set with the QR code 13 as a reference, and the guide frame 15g indicating the peripheral image area 15 is superimposed and displayed on the preview display of the photographed image, so that the user may position the collation image photographing machine 22 while visually recognizing the guide frame 15g.

On the other hand, regarding the elevation angle φ (refer to FIG. 1) of the collation image photographing machine 22 with respect to the object 10, in a case where the object 10 is as shown in FIG. 3A, the color change of the satin-treated hologram portion 12b on which the ink portion 14 is formed can be utilized. That is, since the color development of the rainbow color of the satin-treated hologram portion 12b changes depending on the elevation angle, the elevation angle φ can be adjusted by adjusting the color development in the hologram portion 12b around the ink portion 14, more specifically, by adjusting the color development in the peripheral image area 15 excluding the ink portion 14 to a desired color (or pattern).

Specifically, the processor 22c detects the color development pattern in the peripheral image area 15 in the photographed image, determines whether or not the color development pattern is a desired color development pattern in accordance with the elevation angle φ, and displays the determination result on the output unit 22g as a guide.

Figure 6A:
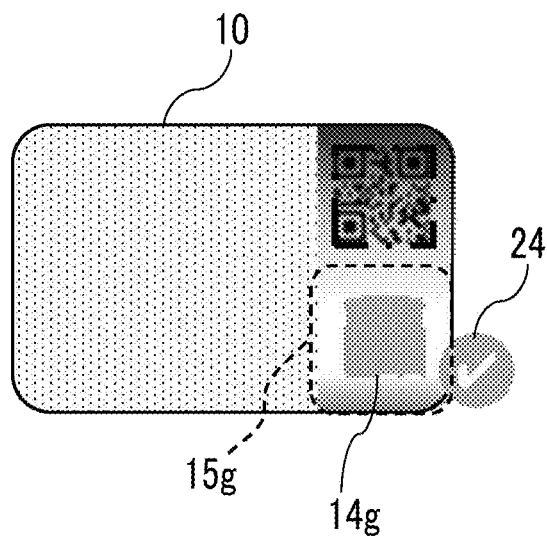
FIGS. 6A and 6B are explanatory diagrams (No. 2) of a guide displayed on an output unit (display unit) of a collation image photographing machine of an exemplary embodiment.
Figure 6B:
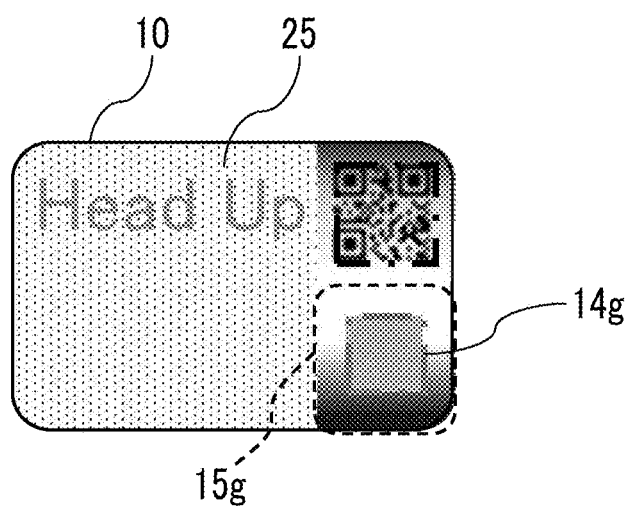

FIGS. 6A and 6B show still another example of the guide displayed on the output unit 22g of the collation image photographing machine 22. FIG. 6A is a guide example in a case where the color development pattern of the hologram portion 12b in the peripheral image area 15 is a desired color development pattern (desired rainbow color). In addition to the guide frames 13g, 14g, and 15g, a mark 24 of a specific color (for example, green) indicating that the elevation angle is the desired elevation angle in association with the guide frame 15g is displayed in the vicinity of the guide frame 15g indicating the peripheral image area 15. By visually recognizing these guide frames 13g, 14g, 15g, and the mark 24, the user may easily confirm that the photographing position of the collation image photographing machine 22 is a desired position. Note that in addition to the mark 24, a guide indicating a desired specular reflection position of the light source unit 22a may be displayed in FIG. 6A. The user may more reliably adjust the elevation angle φ by adjusting the specular reflection position of the light source unit 22a in the photographed image so as to substantially match the mark. This is because the elevation angle φ is determined by the positional relationship between the light source unit 22a, the object 10, and the camera unit 22b, as shown in FIG. 1.

FIG. 6B is a guide example in a case where the color development pattern of the hologram portion 12b in the peripheral image area 15 is not a desired color development pattern (desired rainbow color). The guide frames 14g and 15g are displayed, but the mark 24 is not displayed. Then, instead of the mark 24, a message 25 indicating that the elevation angle φ is not appropriate or indicating an adjustment direction for adjusting the elevation angle φ to a desired angle is displayed. In FIG. 6B, the message 25 "Head UP" prompting a head side of the collation image photographing machine 22 to be raised is displayed, corresponding to a case where the rainbow color in the peripheral image area 15 is a color development pattern that appears in a case where the head side of the collation image photographing machine 22 is lowered (in a case of a smartphone, a side where the light source unit 22a or the camera unit 22b is provided).

By displaying the mark 24 or the message 25 on the output unit 22g in this way, it is possible to prompt the user to pay attention to the color or pattern around the ink portion 14, make it easier to match the sample shown in a manual or the like, and shorten the time until a good image of the ink portion 14 is photographed.

Note that in FIG. 6B, the guide frame 14g of the ink portion 14 is displayed in gray, but this is in view of the fact that the color development around the ink portion 14 is not appropriate. The processor 22c displays all the guides at the start of photographing, changes the color of the guide frame 14g and changes display or non-display of the mark 24 or the message 25 during photographing. Further, in consideration of the ease of positioning by the user, the processor 22c may detect the QR code 13, display the guide frame 13g and the guide frame 15g after setting the peripheral image area 15, and further change the display step by step so as to display the guide frame 14g of the ink portion 14 in a case where it is determined that the color development in the peripheral image area 15 is the desired color development.

Next, the processing of the processor 22c in the present exemplary embodiment will be described in detail by taking a case where the object 10 is as shown in FIG. 3A as an example.

Figure 7:
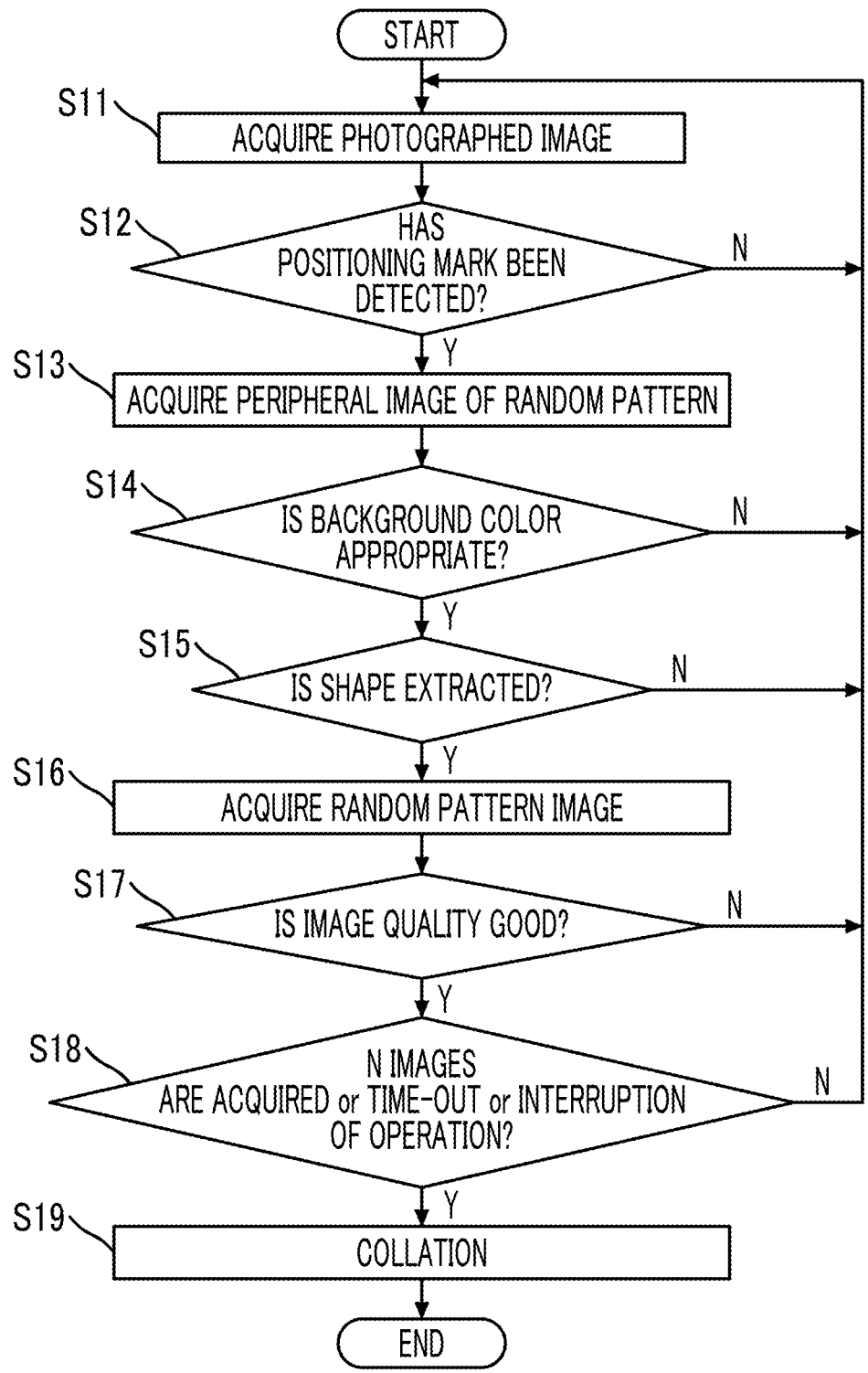
FIG. 7 is a processing flowchart of an exemplary embodiment.

FIG. 7 shows a processing flowchart of the processor 22c. The processing is processing realized by reading and executing a program stored in the ROM 22d or the like.

First, the processor 22c acquires a photographed image obtained by the camera unit 22b (S11).

Next, a positioning mark is detected from the acquired photographed image (S12). The positioning mark is, for example, the QR code 13, and the QR code 13 is identified from the photographed image by detecting a cut-out symbol, a timing pattern, an alignment pattern, and format information included in the QR code 13.

In a case where the QR code as the positioning mark and the reference position area is detected (YES in S12), the position of the QR code 13 is used as a reference, and the peripheral image area 15 is set by using second relative positional relationship data predetermined and stored in the memory. Instead, the processor 22c may access the server computer 50 and acquire the second relative positional relationship data (relative coordinate data) from the server computer 50. At this time, by transmitting an ID of the object 10 obtained by reading the QR code 13 to the server computer 50, the relative positional relationship data corresponding to the object 10 can be acquired from the server computer 50. Then, the guide frame 15g indicating the peripheral image area 15 is displayed on the output unit 22g, and a peripheral image corresponding to the peripheral image area 15 is acquired from the photographed image (S13). Since the acquired peripheral image includes an image of the ink portion 14 as a random pattern, the image is referred to as a random pattern peripheral image.

In a case where the random pattern peripheral image is acquired, it is determined whether or not a background color of the ink portion 14 included in the random pattern peripheral image is appropriate (S14). That is, a color development pattern of the background color is predetermined and compared with a desired color development pattern stored in the memory, and in a case where the patterns match, it is determined to be appropriate, and in a case where the patterns do not match, it is determined to be inappropriate. Specifically, a center of gravity position of a specific color included in the background color is calculated, and the center of gravity position is compared with a center of gravity position corresponding to the desired color development pattern. In a case where it is determined that the background color is not appropriate (NO in S14), the message 25 shown in FIG. 6B is displayed on the output unit 22g, and the processing after S11 is repeated.

Figure 8A:
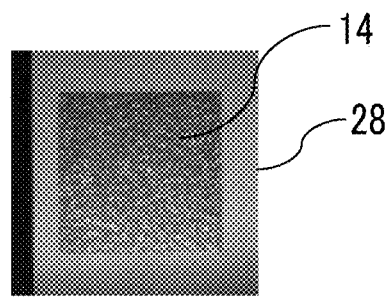
FIGS. 8A to 8C are explanatory diagrams of a background color evaluation of a photographed image of an exemplary embodiment.
Figure 8B:
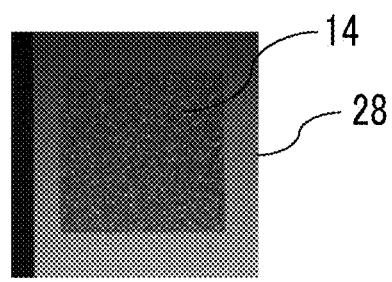
Figure 8C:
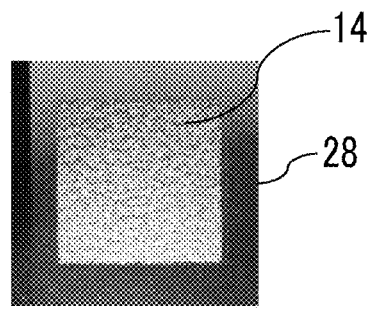

FIGS. 8A to 8C schematically show the processing of S14. FIG. 8A is an example of a case where the background color of a random pattern peripheral image 28 around the ink portion 14 is appropriate. Further, FIGS. 8B and 8C are examples of cases where the background color of the random pattern peripheral image 28 around the ink portion 14 is not appropriate.

The background color of the random pattern peripheral image 28 changes peculiar to the satin-treated hologram portion 12, that is, the color development of the rainbow color changes in accordance with the elevation angle, in other words, the characteristic of the reflected light changes depending on an irradiation direction of light. Although it is possible to estimate the elevation angle from the shape of the QR code 13 as the positioning mark, since the positioning mark requires a relatively large size, there are restrictions on the object 10 or the design of the positioning mark. Further, under the condition that both are satisfied, that is, an angle of view enters an angle of view of the camera unit 22b and has an appropriate positional relationship with the light source unit 22a, since the area that can be used to estimate the elevation angle is small, an accuracy is reduced.

On the other hand, in the satin hologram portion 12b, the color development of the rainbow color is different depending on the elevation angle, so that the center of gravity position of the specific color (for example, red, yellow, and light blue) in the random pattern peripheral image 28 is calculated by binarization processing of the RGB-decomposed and the elevation angle can be reliably estimated by determining whether or not the elevation angle falls within the preset threshold. In a case of a smartphone or the like in which the light source unit 22a and the camera unit 22b are integrally mounted, the determination of whether or not the elevation angle is appropriate can be said to be synonymous with the determination of whether or not a posture of the smartphone is appropriate.

Referring back to FIG. 7, in a case where it is determined that the background color is appropriate (YES in S14), the mark 24 shown in FIG. 6A is displayed on the output unit 22g, and the shape of the ink portion 14 (square in the present exemplary embodiment) is extracted from the acquired random pattern peripheral image 28 (S15).

Figure 9:
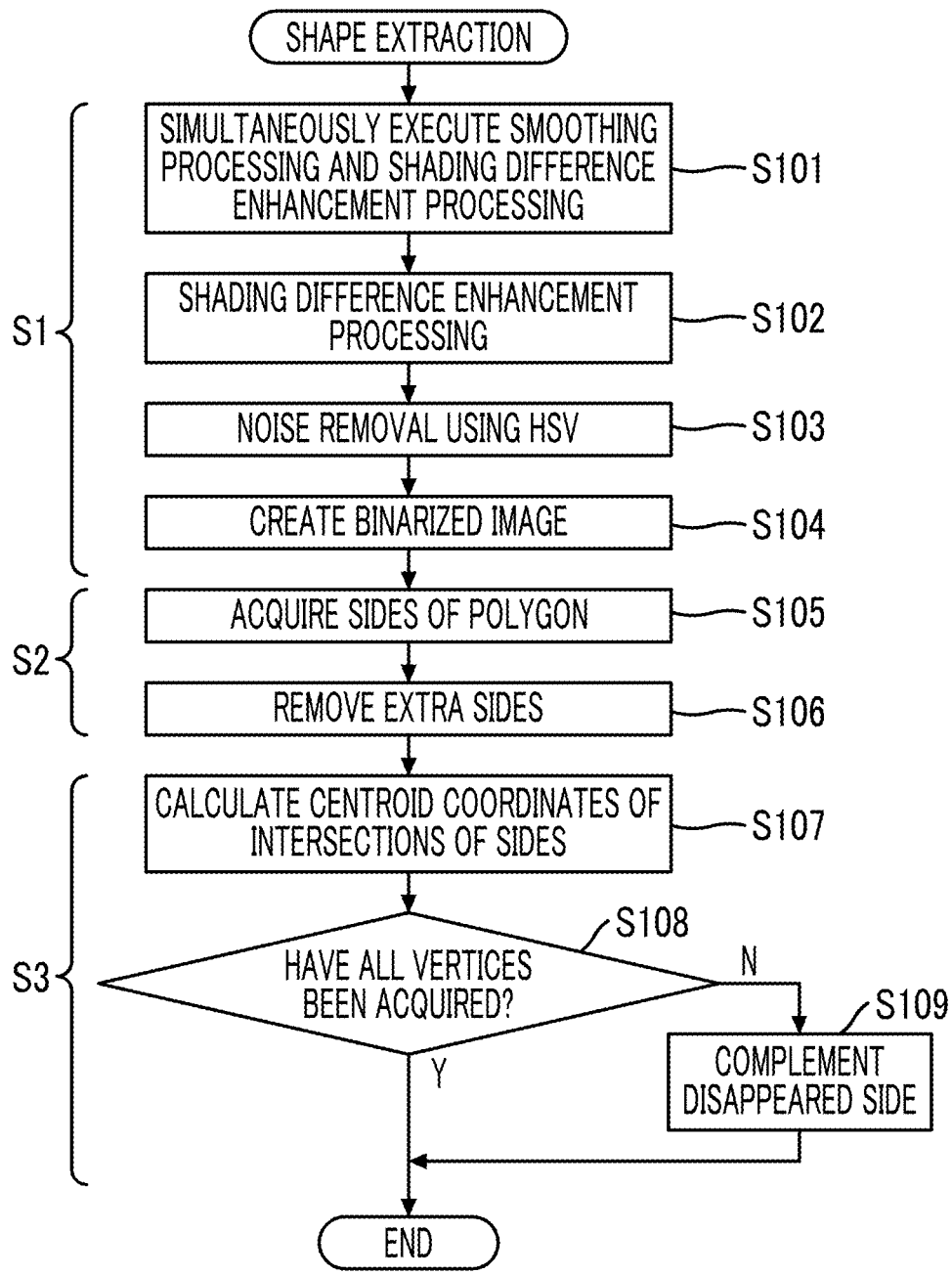
FIG. 9 is a flowchart showing detailed processing of shape extraction of an exemplary embodiment.

FIG. 9 shows a detailed flowchart of shape extraction.

The purpose of the processing flowchart is to acquire coordinates of four vertices of the square ink portion 14 from the random pattern peripheral image 28, and the processing is substantially classified into three processing of binarized image generation processing (S1), rectangular edge extraction processing (S2), and vertex coordinate estimation processing (S3).

Binarized Image Generation Processing

First, the binarized image generation processing (S1) will be described.

In the processing, first, smoothing processing and shading difference enhancement processing are simultaneously executed on the original image of the random pattern peripheral image 28 (S101). The shape of the ink portion 14 is blurred by simply performing the smoothing processing on the original image. Further, although the unevenness of the ink portion 14 is emphasized by simply performing the shading difference enhancement processing on the original image, the unevenness of the hologram portion 12b is also emphasized at the same time, so that the ink portion 14 cannot be extracted.

Therefore, the smoothing processing and the shading difference enhancement processing are simultaneously executed on the original image to remove the unevenness of the hologram portion 12b and the ink portion 14, and the ink portion 14 is identified from the hologram portion 12b. Specifically, a mean-shift filter can be used for simultaneous execution of the smoothing processing and the shading difference enhancement processing. The mean-shift filter is realized by the processor 22c. The mean-shift filter is a filter that fills similar colors in a designated pixel space with the same color. As a result, the color of the silver ink portion 14 approaches the same color, and a boundary between a rainbow-colored background of the hologram portion 12b and the silver ink portion 14 has a different color area, so that a shading difference of the boundary between the hologram portion 12b and the ink portion 14 is emphasized while the shape of the ink portion 14 is maintained.

Note that although there is a filtering method of performing smoothing processing while retaining the edges, such as a bilateral filter, the inventors have confirmed that the noise in the hologram portion 12b and the ink portion 14 cannot be removed by the method. By using the mean-shift filter, smoothing is performed for each color by using the color difference between the hologram portion 12b and the ink portion 14 while retaining the edges, and noise can be removed without losing the edges.

The mean-shift filter first searches for the center of gravity of the color distribution of the original image. That is, centroid coordinates (xc, yc) and the colors (rc, gc, bc) of a color space area having a radius sr centered on the colors (r, g, b) of certain pixels (x, y) are calculated and the center of gravity is searched under the following condition. Here, sp is a radius of a search area.

Condition: $|x-xc| \leq sp, |y-yc| \leq sp, \|(r,g,b)-(rc,gc,bc)\| \leq sr$

Then, in a case where the above condition is satisfied, the center of gravity is searched again by setting (x, y, r, g, b)=(xg, yg, rc, gc, bc). The above center of gravity search processing is repeatedly executed.

Then, a color space distance E and the number of repetitions n are set in advance, it is determined whether or not the following condition is satisfied, and in a case where the condition is satisfied, the processing ends.

Condition: the number of repetitions n is satisfied, or $|x-xc|+|y-yc|+(r-rc)^2+(g-gc)^2+(b-bc)^2 < \varepsilon$.

After the center of gravity search processing ends, smoothing is performed with the value of the center of gravity in the color space. That is, after the polar search ends, each pixel in the space is set as a center of gravity value of the color space. The edges are then clarified by using the Gaussian pyramid and the threshold sr.

Since the mean-shift filter performs the smoothing processing by using a distance difference in the color space, this is effective processing in a case where there is a difference in the color space distance between the foreground and the background. Therefore, this is an effective processing for the original image in which an achromatic ink portion 14 exists in the foreground and a chromatic hologram portion 12b exists in the background.

In the mean-shift filter, the performance of the smoothing processing and the shading difference enhancement processing can be controlled by using a color space radius sr and a pixel space radius sp as main parameters. Therefore, by adjusting the parameters, a ratio of the smoothing processing and the shading difference enhancement processing can be adjusted. Specifically, (1) since a search range of pixels smoothed (filled) by the pixel space radius sp is designated, in a case where sp is large→search range can be adjusted to be wide, and in a case where sp is small→search range can be adjusted to be narrow.

Note that in a case where the sp is set too large, it takes a long time to processing, so, for example, it is desirable to take this into consideration.

(2) Since the range of similar colors to be filled in the same color is determined by the color space radius sr, in a case where sr is large→it can be adjusted so that even slightly different colors are recognized as the same color, and in a case where sr is small→it can be adjusted so that similar colors are recognized as the same color.

In the present exemplary embodiment, the parameters sp and sr of the mean-shift filter are set to (sp, sr)=(10, 30), and the like.

After the smoothing processing and the shading difference enhancement processing are simultaneously executed on the original image (S101), an additional shading difference enhancement processing is further executed for a portion where the shading difference cannot be obtained by the processing of S101 (S102).

In a case where there is no sufficient difference in the color space distance between the background color and the ink portion 14, the foreground and the background are assimilated, and there may be portions where the shading difference enhancement is insufficient only by the processing of S101. Therefore, by further executing the shading difference enhancement processing, the shape of the ink portion 14 is extracted more stably.

Specifically, the image processed in S101 is RGB-decomposed, and the shading difference enhancement processing is executed in each RGB color space. This means flattening of an in-image brightness histogram. Then, in order to extract an edge gradient, a Sobel filter for each of the vertical and horizontal directions is applied to each RGB color image. Note that since a gradient value calculated by the Sobel filter is not eight bits (256 gradations), this may be normalized to eight bits. The normalization method is processing of taking an absolute value of a gradient image and replacing all the pixel values of 255 or more with 255. As a result, the edge gradient can be acquired independently of disturbance noise.

After executing additional shading difference enhancement processing (S102), noise removal processing using an HSV color space is executed (S103). Here, the HSV color space is a color space composed of three components of Hue, Saturation/Chroma, and Value/Brightness.

In a case where a rough shape of the ink portion 14 is extracted in S102, noise is generated at a boundary between the white color and the light blue color of the hologram portion 12. In particular, since the gradients of the white color and the light blue color in an R space image are large, noise such as an edge is generated in a case where the Sobel filter is applied. Therefore, the noise is removed by using the HSV color space. Specifically, (1) the processed image 13 in S101 is HSV decomposed.
(2) S image is binarized.
(3) vertical and horizontal Sobel filter is applied to S binary image.
(4) black-and-white inverted binary image of vertical and horizontal Sobel image and H image are OR-synthesized.

After executing the processing of S103, a binarized image is created (S104). That is, a total of 6 vertical and horizontal gradient images of the R, G, and B images are respectively binarized. A binarization threshold may be set differently for each of R, G, and B. Then, a total of six binarized images of vertical and horizontal components and RGB color components are OR-synthesized.

Rectangular Edge Extraction Processing

Next, the rectangular edge extraction processing will be described.

After creating the binarized image in S104, the sides of the polygon constituting the square ink portion 14 are acquired from the binarized image (S105). Specifically, this is edge extraction processing using a stochastic Hough transform. Note that the stochastic Hough transform is an optimization of the Hough transform, and instead of calculating using all the pixels, points sufficient for straight line detection are randomly selected from the image and calculated. A (non-stochastic) Hough transform can also be used in S104. However, parameter tuning is difficult, and there is a drawback that the sensitivity is too good for the rectangular edges of the binarized image.

After acquiring the sides of the polygon (S105), the processing of removing extra sides is executed (S106). That is, straight lines that are not rectangular edges (sides) are removed from the straight lines extracted by the stochastic Hough transform. Specifically, a method of removing a straight line having an inclination of a fixed value or more, or a straight line long with respect to the size of the collation area 14, a straight line of which an angle in which vertical and horizontal lines intersect is within a fixed angle, or removing a straight line in contact with an image frame is used. In addition to this, extra sides may be removed by extracting edges with a rectangular hue by using a color space.

Vertex Coordinate Estimation Processing

After the rectangular edge extraction processing (S2) is completed, the vertex coordinate estimation processing (S3) of the square ink portion 14 is executed.

In the processing, the centroid coordinates of the intersections of the sides are calculated from the image obtained by removing the extra sides in S106 (S107). That is, instead of the intersections consisting of each side, the centroid coordinates of an intersection group within a certain vicinity are calculated. Although the intersections of vertical and horizontal straight lines are calculated for the processed image 23 by addressing a one-dimensional simultaneous equation, since an edge width of the binarized image after OR synthesis is two to three pixels, a plurality of straight lines are extracted for the same edge by the stochastic Hough transform. Therefore, are plurality of intersections in the vicinity of certain coordinates. Since these intersections are likely to indicate the same vertex, the centroid coordinates of the intersection group are acquired, and the centroid coordinates are redefined as the vertices of the shape of the ink portion 14.

In the centroid coordinate calculation processing of the intersection group, first, a plurality of intersections in a certain vicinity are dilated and combined into one. The dilation processing is processing in which in a case where there is a white pixel in peripheral pixels of a certain pixel, the pixel is converted into the white pixel thereby sequentially expanding the white pixel. Next, labeling is performed on each intersection set that has been dilated. Then, the centroid coordinates of each labeled intersection set are calculated. In a case where the centroid coordinates are calculated as described above, the calculated centroid coordinates are set as the vertex candidates.

Since there are four vertices in the square ink portion 14, four vertex candidates can be set normally. In a case where setting the vertex candidates, known shape characteristics of the ink portion 14, that is, the lengths of the sides and diagonal lines can be used as the condition. In a case where there are a plurality of pairs of vertices that satisfy the condition, a plausible pair of vertices is selected. For example, in the square ink portion 14, the condition that the lengths of the four sides are equal to each other is used, and the pair having the smallest dispersion of the side lengths is set as the pair of vertices.

Then, it is determined whether or not all the vertices of the ink portion 14 have been acquired (S108). In the square ink portion 14, it is determined that all the vertices have been acquired in a case where the four vertices are acquired. In a case where all the vertices have not been acquired, it means that all the sides of the ink portion 14 have not been extracted, so complementary processing of the disappeared side is executed next (S109).

In the complementary processing of the side, it is determined whether or not three sides constituting the square have been extracted from the square ink portion 14. Normally, in a case where the ink portion 14 is printed on the hologram portion 12*b* as a printing substrate, in a case where the red of the background of the hologram portion 12 is covered with the red of the foreground, extraction of the side may fail. In short, it is a case where a color space distance difference between the background and the foreground is small. Therefore, it is first determined whether or not the three sides have been extracted. The selection of the three sides can be estimated from the known shape characteristics of the ink portion 14, that is, the length or the position of the edges.

In a case where three sides are extracted, a length x of the side among the three sides having no opposite side is calculated from the centroid coordinates already calculated. Then, a new parallel side is drawn at a portion separated by the length x of the side. Specifically, it is assumed that the four sides constituting the square are a, b, c, and d, a and c are opposite sides, and b and d are opposite sides, and in a case where only three sides of a, b, and c are extracted, a side parallel to b is drawn at a position separated by x from b to be d. As parallel sides separated by x from b, it is possible to estimate a total of two, one on each of the both sides of b, and since one of the sides does not exist in the image, the side d can be uniquely drawn. This complements the disappeared sides.

After the complementary processing of the disappeared side, the centroid coordinates of the intersection may be calculated again to acquire the coordinates of all the vertices.

Note that after the complementary processing of the disappeared sides, the threshold may be lowered for the binarized image obtained in S104, and the stochastic Hough transform may be executed again to reacquire the side, and the side obtained in this way and the side obtained by complementing may be integrated, and the processing may be transferred to the vertex coordinate estimation processing (S3) again.

Referring back to FIG. 7, in a case where the shape is extracted by acquiring the coordinates of the four vertices of the ink portion 14 as described above (YES in S15), the processor 22*c* acquires a random pattern image by cutting out a collation n image with reference to the coordinates of these four vertices (S16). Then, an image quality evaluation of the obtained random pattern image, that is, whether or not the image quality of the random pattern image is good is determined (S17).

Specifically, whether or not the image quality is good can be determined by evaluating the following index values and determining whether or not these index values exceed the threshold.

(1) Whether the position, size, and angle of the square are appropriate (2) Degree of blur (standard deviation of Laplacian filter value)

(3) Degree of shaking (maximum and minimum differences of standard deviation of Sobel filter values in four directions)

(4) Brightness (average brightness)

(5) Randomness (a value obtained by cutting out a portion of the central ¼ size of the image, obtaining a correlation value between each coordinate of the image and the image of the same size as a starting point, subtracting an average value from the maximum value of a correlation value group, and dividing by the standard deviation)

(6) Degree of deviation of the light source (aspect ratio of a brightness inclination of the image=an inclination in a case where an average brightness of the same row is linearly approximated in the column direction/the inclination in a case where the average brightness of the same column is linearly approximated in the row direction)

It is possible to determine whether or not the image quality is good by optionally combining any one or a plurality of these index values. For example, (1) and (6) are used, (1), (5), and (6) are used, or the like.

The processing of S11 to S17 is automatically repeated until a predetermined upper limit number of N images are acquired, until a timeout, or until the user interrupts the photographing operation (S18). Then, the collation processing is executed by using the random pattern images obtained for the upper limit number of N images or a plurality of random pattern images obtained until the timeout or the interruption of photographing (S19).

In the collation processing, a collation request is transmitted to the server computer 50 with the acquired upper limit number of N images or a plurality of random pattern images attached. The collation unit 50*a* of the server computer 50 collates the received random pattern image with the registered image, and returns the collation result to the collation image photographing machine 22. The processor 22*c* receives the collation result from the server computer 50 and displays the collation result on the output unit 22*g*.

As described above, in the present exemplary embodiment, since the peripheral image area 15 is set with reference to the QR code 13 as the positioning mark, and the ink portion 14 is extracted in this peripheral image area, even in a case where the positional relationship between the QR code 13 and the ink portion 14 varies, the ink portion 14 can be stably extracted.

Figure 10:
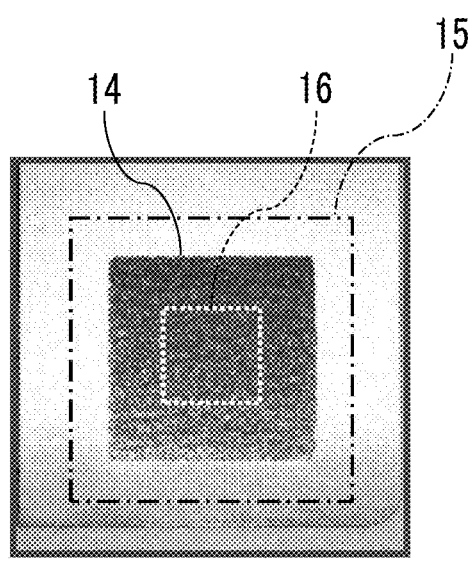
FIG. 10 is an explanatory diagram showing a positional relationship between a peripheral image area, an ink portion, a registered image, and a collation image of an exemplary embodiment.

FIG. 10 shows the ink portion 14, the peripheral image area 15 set for the ink portion 14, and the collation image 16 cut out from the ink portion 14 in the present exemplary embodiment. In the present exemplary embodiment, areas are gradually specified in the order of peripheral image area 15→shape extraction of ink portion 14→cutting out of collation image 16.

Further, in the present exemplary embodiment, it is determined whether or not the background color (or pattern) of the peripheral image area 15 is appropriate, and the shape of the ink portion 14 is extracted based on the result. However, compared with the shape extraction processing, the color (or pattern) determination processing has relatively low accuracy, but high-speed processing is possible, and thus it is possible to increase photographing frequency by first determining whether or not photographing has been performed in an appropriate posture and re-photographing in a case where the posture is not appropriate, and it is possible to increase the probability of acquiring the image of the ink portion 14 having an appropriate image quality within a fixed period of time by increasing the photographing frequency. To this end, in addition to the function of specifying the position of the ink portion 14, the peripheral image area 15 has a function of defining a determination area in a case where determining whether or not the background color (or pattern) around the ink portion 14 is appropriate.

Hereinabove, although the case where the object 10 is as shown in FIG. 3A has been described as an example, in a case where the printing substrate of the object 10 is paper 11 as shown in FIG. 3B, the QR code 13 may be used as a calibration patch, the brightness may be corrected by black or the like of the QR code 13, and then it may be determined whether or not a vertical brightness inclination in the QR code 13 is within an appropriate range instead of the processing of S14 in FIG. 7. The vertical brightness inclination can be defined as an inclination in a case where the average brightness in the same column is linearly approximated in the row direction.

Further, in the present exemplary embodiment, the hologram portions 12a and 12b are exemplified, but a polarizing sheet may be used instead of the hologram portions 12a and 12b.

Further, in the present exemplary embodiment, although a plurality of random pattern images having good image quality are acquired and transmitted to the server computer 50 for collation, one random pattern image having the best image quality may be selected and transmitted to the server computer 50 for collation.

Further, in the present exemplary embodiment, the QR code 13 is used as the positioning mark and the reference position area, but instead, the edge itself of the ink portion 14 may be used as the positioning mark and the reference position area, and the peripheral image area may be set from the positioning mark and the reference position area according to a third relative positional relationship. In this case, the peripheral image area is not set to enclose the ink portion 14 as shown in FIG. 4B, but is set in the ink portion 14. This is based on the fact that the registered image registered in the registered image DB 50b is not the entire ink portion 14, but only a partial area of the ink portion 14.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A collation device comprising:
a processor, storing a registered image in association with an identity of a registered object, the registered image acquired by irradiating the registered object with a light source at a predetermined irradiation angle, and configured to, by executing a program:
(a) receive a photographed image including a collation area provided on an object and a reference position area that serves as a reference for a position of the collation area, wherein the photographed image is acquired by photographing the object to be collated by using a mobile terminal as the collation image photographing machine, and at an elevation angle that is formed by a light source, the object, and a camera of the collation image photographing machine used to capture the object;
(b) detect the reference position area from the photographed image;
(c) acquire a peripheral image area from the photographed image based on the reference position area and predetermined relative coordinates; and
determine a color of a background area of the peripheral image area in the photographed image, wherein the color changes depending on the elevation angle, and determine whether the color is appropriate or not by comparing the color with a desired color stored in a memory, wherein the desired color is a color of a background area of the registered object, at an angle at which the registered image was acquired,
repeat processing of the (a) to (c) in a case where the color does not match the desired color using a new photographed image, which is obtained by adjusting the elevation angle, until the color matches the desired color;
(d) detect the collation area in the peripheral image area, wherein the processor is further configured to:
determine an image quality of a random pattern image of the detected collation area is good or not by evaluating a plurality of index values related to the random pattern image and determine whether or not the index values exceed a predetermined threshold,
in a case where the evaluation value of the random pattern image of the detected collation area is equal to or less than the threshold, calculate an evaluation value of an image of the detected collation area, and repeat processing of the (a) to (d) using the new photographed image, and after adjusting an elevation angle to a desired angle in a case where the evaluation value is equal to or less than a threshold, collate the random pattern image with the registered image, and return the collation result to the collation image photographing machine.

2. The collation device according to claim 1, further comprising:
a display unit,
wherein the processor is configured to:
display a guide indicating the peripheral image area on the display unit.

3. The collation device according to claim 2, wherein the processor is configured to:
   display a guide indicating the collation area on the display unit.

4. The collation device according to claim 3, wherein the processor is configured to:
   after setting the peripheral image area, determine a color or pattern of a background area of the peripheral image area in the photographed image, and repeat processing of the (a) to (c) using the new photographed image after adjusting the elevation angle to the desired angle in a case where the pattern does not match a predetermined condition.

5. The collation device according to claim 2, wherein the processor is configured to:
   after setting the peripheral image area, determine a color or pattern of a background area of the peripheral image area in the photographed image, and repeat processing of the (a) to (c) using the new photographed image after adjusting the elevation angle to the desired angle in a case where the pattern does not match a predetermined condition.

6. The collation device according to claim 2, wherein the processor is further configured to:
   acquire data of the relative coordinates from an external server.

7. The collation device according to claim 1, wherein the processor is configured to:
   after setting the peripheral image area, determine a color or pattern of a background area of the peripheral image area in the photographed image, and repeat processing of the (a) to (c) using the new photographed image after adjusting the elevation angle to the desired angle in a case where the pattern does not match a predetermined condition.

8. The collation device according to claim 7, wherein the processor is further configured to:
   notify a user in a case where the color or pattern matches the predetermined condition.

9. The collation device according to claim 1, wherein the processor is further configured to:
   acquire data of the relative coordinates from an external server.

10. The collation device according to claim 1, wherein the processor is further configured to:
    notify a user in a case where the reference position area is detected.

11. The collation device according to claim 1,
    wherein the collation area has a specific shape of an ellipse including a circle or a polygon, and
    the processor is configured to:
       detect the collation area by extracting the specific shape from the peripheral image area.

12. The collation device according to claim 1,
    wherein the reference position area includes a QR code.

13. A non-transitory computer readable medium storing a program causing a computer processor to execute a process, wherein a registered image in association with an identity of a registered object is stored, and the registered image is acquired by irradiating the registered object with a light source at a predetermined irradiation angle, comprising:
    (a) acquiring a photographed image including a collation area provided on an object and a reference position area that serves as a reference for a position of the collation area;
    (b) detecting the reference position area from the photographed image;
    (c) setting a peripheral image area in the photographed image based on the reference position area and predetermined relative coordinates;
    repeating processing of the (a) to (c) in a case where the color does not match the desired color using a new photographed image, which is obtained by adjusting the elevation angle, until the color matches the desired color;
    (d) detecting the collation area in the peripheral image area;
    determining an image quality of a random pattern image of the detected collation area is good or not by evaluating a plurality of index values related to the random pattern image and determine whether or not the index values exceed a predetermined threshold, and
    calculating an evaluation value of an image of the detected collation area, and
    repeating processing of the (a) to (d) using a new photographed image after adjusting an elevation angle to a desired angle in a case where the evaluation value is equal to or less than the threshold and acquire a collation image of the new photographed image in which the evaluation value exceeds the threshold, wherein the elevation angle is formed by a light source, the object, and a camera used to capture the object, wherein the photographed image and the new photographed image are captured by the camera, collating the random pattern image with the registered image, and returning the collation result to the collation image photographing machine.

14. The non-transitory computer readable medium according to claim 13, wherein the program causing the computer processor to execute the process further comprising after setting the peripheral image area, determining a color or pattern of a background area of the peripheral image area in the photographed image, and repeating processing of the (a) to (c) using the new photographed image after adjusting the elevation angle to the desired angle in a case where the pattern does not match a predetermined condition.

15. A collation method, wherein a registered image in association with an identity of a registered object is stored, and the registered image is acquired by irradiating the registered object with a light source at a predetermined irradiation angle, comprising:
    (a) acquiring a photographed image including a collation area provided on an object and a reference position area that serves as a reference for a position of the collation area;
    (b) detecting the reference position area from the photographed image;
    (c) setting a peripheral image area in the photographed image based on the reference position area and predetermined relative coordinates;
    repeating processing of the (a) to (c) in a case where the color does not match the desired color using a new photographed image, which is obtained by adjusting the elevation angle, until the color matches the desired color;
    (d) detecting the collation area in the peripheral image area;
    determining an image quality of a random pattern image of the detected collation area is good or not by evaluating a plurality of index values related to the random pattern image and determine whether or not the index values exceed a predetermined threshold, and
    calculating an evaluation value of an image of the detected collation area, and
    repeating processing of the (a) to (d) using a new photographed image after adjusting an elevation angle to a desired angle in a case where the evaluation value is equal to or less than the threshold and acquire a collation image of the new photographed image in which the evaluation value exceeds the threshold, wherein the elevation angle is formed by a light source, the object, and a camera used to capture the object, wherein the photographed image and the new photographed image are captured by the camera, collating the random pattern image with the registered image, and returning the collation result to the collation image photographing machine.

16. The collation method according to claim 15, wherein the method further comprising:
- after setting the peripheral image area, determining a color or pattern of a background area of the peripheral image area in the photographed image, and repeating processing of the (a) to (c) using the new photographed image after adjusting the elevation angle to the desired angle in a case where the pattern does not match a predetermined condition.

\* \* \* \* \*